Oct. 3, 1939.   H. GRIFFIN ET AL   2,174,579
FRAMING DEVICE FOR MOTION PICTURE MECHANISM
Filed Nov. 11, 1936   3 Sheets-Sheet 2
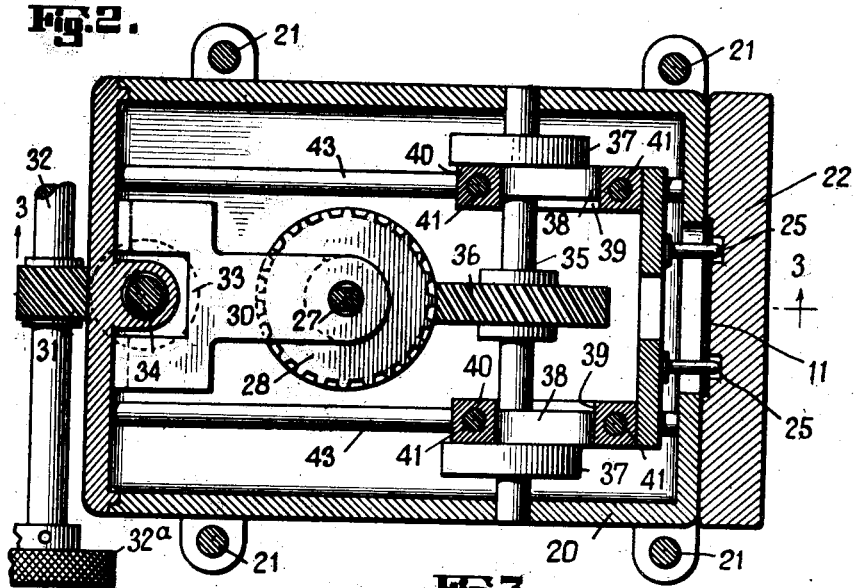
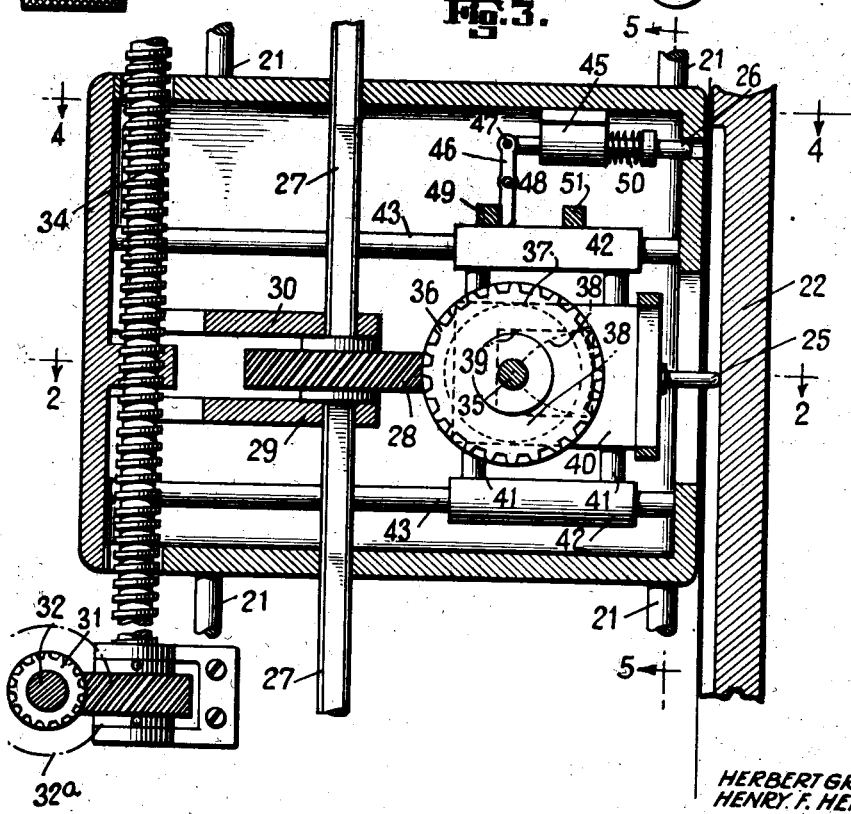
INVENTORS
HERBERT GRIFFIN
HENRY F. HEIDEGGER
BY
Emery, Varney, Whittemore & Dix
ATTORNEYS.

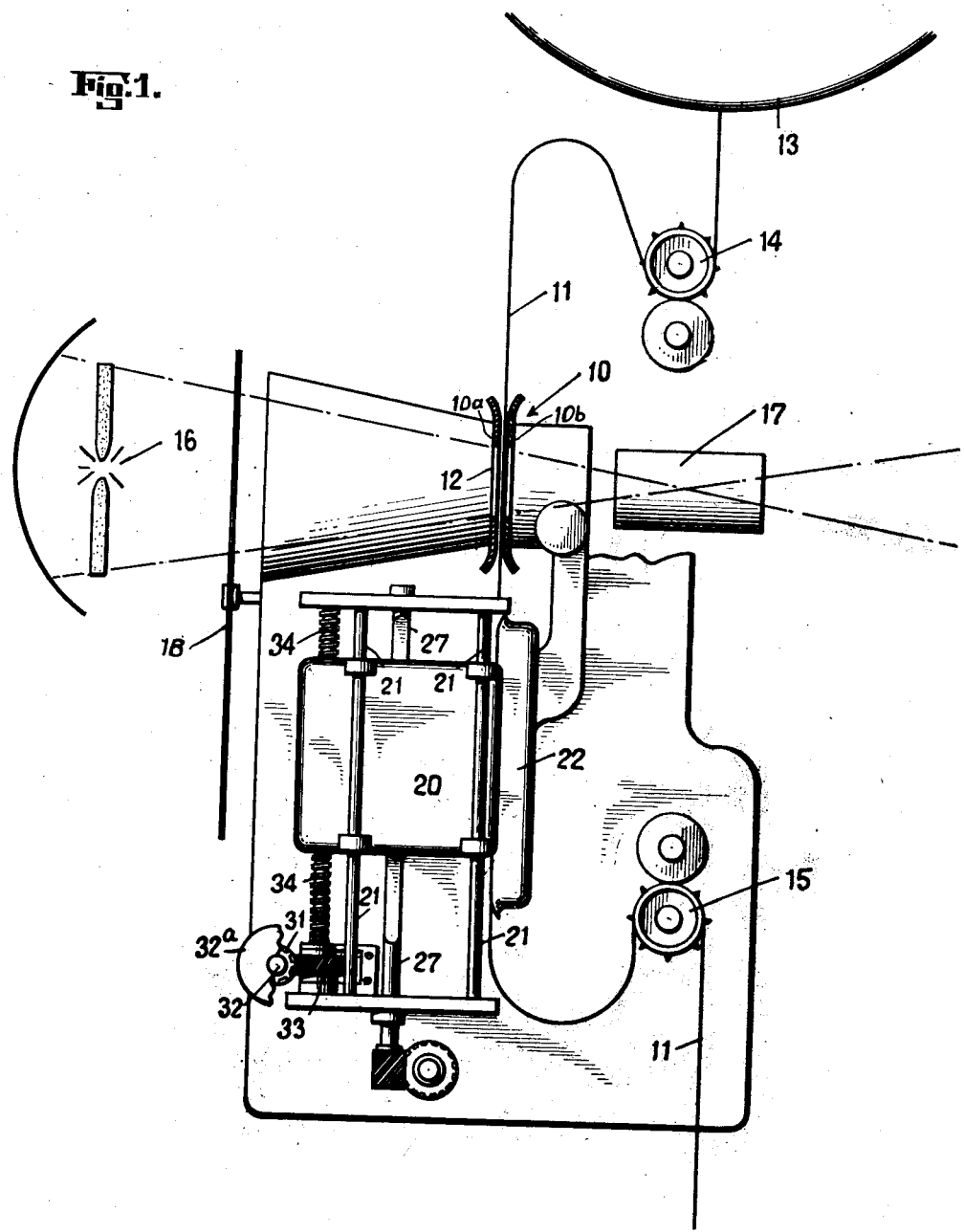

Oct. 3, 1939.  H. GRIFFIN ET AL  2,174,579
FRAMING DEVICE FOR MOTION PICTURE MECHANISM
Filed Nov. 11, 1936   3 Sheets-Sheet 3
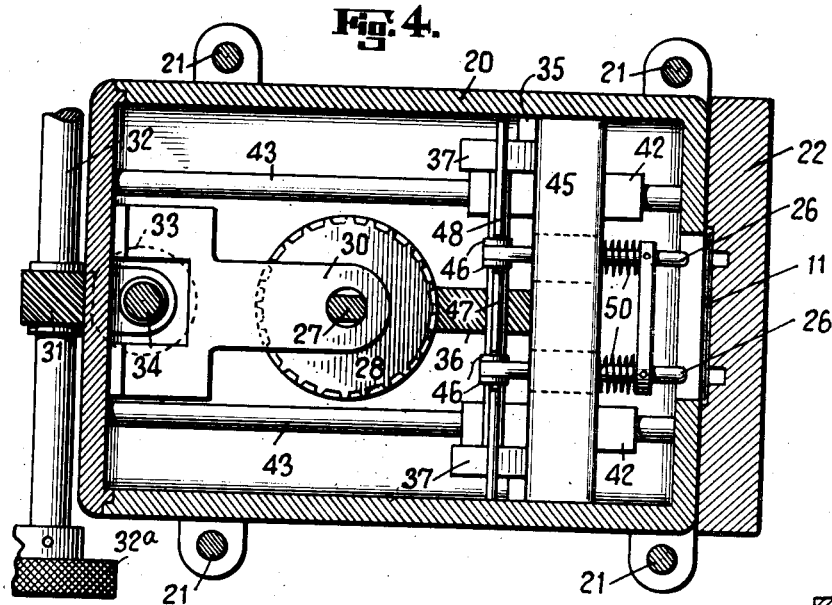
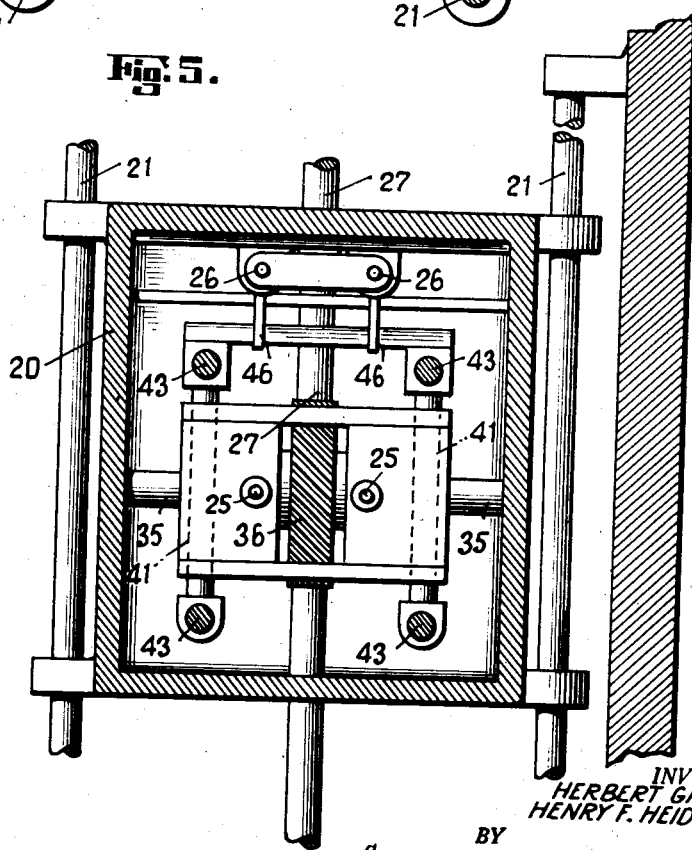
INVENTORS
HERBERT GRIFFIN
HENRY F. HEIDEGGER
BY
Emery, Varney, Whittemore + Dix
ATTORNEYS.

Patented Oct. 3, 1939

2,174,579

UNITED STATES PATENT OFFICE 2,174,579

FRAMING DEVICE FOR MOTION PICTURE MECHANISM

Herbert Griffin, Jersey City, N. J., and Henry F. Heidegger, Brooklyn, N. Y., assignors to International Projector Corporation, New York, N. Y., a corporation of Delaware Application November 11, 1936, Serial No. 110,264

8 Claims. (Cl. 88—18)

This invention relates to motion picture apparatus and has for an object the provision of improvements in this art. More particularly the invention relates to a framing device for motion picture apparatus employing intermittent film feeding mechanism of the claw type.

One feature of the invention is the provision of means for adjusting the position of the claw feeding mechanism either up or down as required for registering the picture frames of the film strip accurately with the light aperture. Another feature of the invention is the provision of mechanism which will frame the picture at any time, either when threading or while the machine is in operation. Another feature of the invention is the provision of framing mechanism which will keep the film constantly under control at any time and in any position of the film feeding mechanism. A further feature of the invention is the provision of framing mechanism which is simple, inexpensive and reliable and by which the picture may be framed in the minimum of time. Other objects and features of the invention will become apparent to those skilled in the art from the following description of an illustrative embodiment of the invention.

There are two principal types of film feeding devices used in the motion picture art, the intermittent sprocket type and the claw type. The claw type is commonly used with cameras or other mechanisms which utilize new film or film which has not been cut or spliced; the intermittent sprocket type is commonly used with projectors and other mechanisms which are required to utilize spliced or patched film. This situation exists largely because the intermittent sprocket type of feeding mechanism is adapted and has been perfected for the adjustment required for framing which is necessary when the film has been improperly patched or spliced; whereas the claw type of feeding mechanism in its known forms is not susceptible of adjustment for framing.

The necessity for framing when patched film is used is due to the fact that in many instances the splice made in patching creates a frame which is shorter in length than the normal frame. This will produce a lead or lag in the film with reference to the aperture after the spliced frame has passed. It is then necessary for the operator to make an adjustment to carry the film ahead or move it back a certain distance, while the machine continues in operation, to cause the frames to again register with the aperture.

Both the intermittent sprocket type feeding mechanism and the claw type feeding mechanism have their inherent advantages and disadvantages. These are well known and need not be discussed here but it is of importance to note that the intermittent sprocket type is relatively more complex, expensive and subject to objectionable wear than is the claw type. Moreover, the framing mechanism required for the intermittent sprocket type is more complex and expensive than that hereby proposed for the claw type.

One embodiment of the invention will now be described in order to illustrate the principles of the invention, reference being made to the accompanying drawings forming a part of this specification and wherein:

Fig. 1 is a side elevation, largely diagrammatic in nature, of motion picture projecting mechanism embodying the present invention;

Fig. 2 is a horizontal section through the claw feeding mechanism, the view being taken on the line 2—2 of Fig. 3;

Fig. 3 is a vertical section taken on the line 3—3 of Fig. 2;

Fig. 4 is a horizontal section taken on the line 4—4 of Fig. 3; and

Fig. 5 is a vertical section taken on the line 5—5 of Fig. 3.

The improved film feeding device is shown by way of example to be associated with a motion picture projector. In Fig. 1 the principal parts of the projector assembly are shown diagrammatically. The assembly comprises a film aperture gate mechanism 10, including the trap element 10a and the gate element 10b, for guiding and positioning a strip of film 11 during its passage past a light aperture 12. The film issues from a magazine 13 and passes over sprockets 14 and 15 suitably driven in synchronism to form loops in the film on either side of the aperture. Light from a source 16 passes through the aperture and a lens assembly 17 to a screen, not shown. A shutter is designated by the numeral 18.

The means for controlling the movement of the film, which is referred to herein as the feeding means comprises claw and pin mechanism mounted in a housing 20 which is slidable vertically on guide rods 21. A movement gate element 22 is mounted opposite the feeding means in housing 20 for assisting the front portion of the housing in holding the film in proper position for action thereupon by the feeding means. The front portion of the housing 20 corresponds in function to what is commonly termed a film trap element or mechanism. The movement gate element is of sufficient length to take care of the vertical adjustment of the feeding means for framing, the range of adjustment being at least the length of one frame on the film. The movement film trap element and the movement gate element will hereinafter be referred to collectively as the movement gate mechanism.

Provision is made for threading the film in the feeding device. This may be accomplished by mounting the movement gate element for travel from and toward the claw housing 20 in a manner similar to that of known aperture gate mechanisms. Or the movement gate element may be made integral with and move with the separable part of the aperture gate element mechanism, as shown. The movement gate element may be provided with longitudinal slots or recesses behind the guiding plane for the film to accommodate the movement of the claw and pin in any adjusted position.

As shown in Figs. 2 to 5 the film feeding means comprises a claw 25 and a cooperating pin 26. Both the claw and pin are bifurcated so as to engage the sprocket holes on both edges of the film. The claw has a vertical reciprocatory movement through a range equal to the length of one frame for feeding the film and also a horizontal reciprocation or in-and-out movement for engaging and disengaging the film. The pin, as illustrated, has only a horizontal reciprocation or in-and-out movement for engaging and disengaging the film though it also might have a vertical reciprocation for feeding the film by a suitable arrangement which would avoid interference with the movement of the claw, as for example, by having the claw engage the sprocket holes on one side of the film and the pin engage the holes on the other side in the same zone of movement or by having the claw and pin engage both rows of sprocket holes but in different zones of action. In any case there will be an overlapping period of engagement with the film by both members so as to maintain constant control of the film. However, it is desirable that both the claw and pin engage the sprocket holes at both edges of the film and that the pin be located very near the range of movement of the claw, so the illustrated form is preferred. Moreover, some film engaging means other than a pin might be employed but the pin is preferred because its action is positive and dependable.

The friction on the film provided by the film guiding means will be adequate to hold the film accurately in any position to which it is carried by the claw so that in the normal operation of the machine the pin 26 has no action upon the film; but on account of the fact that it may be necessary to frame the film at any time during the operation of the apparatus it is necessary to provide feeding means which maintains continuous engagement with the film. For this reason the pin 26 or some equivalent device for use in conjunction with the feeding claw is required. The pin may therefore be referred to as a framing pin. It is arranged to be operated in such a way that it will engage the film after the claw has ceased to move the film forward but before the claw has withdrawn from the film and to disengage the film as soon as the claw has been reengaged with it but before the claw begins to move it forward.

The mechanism for operating the claw and pin is mounted in the housing 20 so as to move therewith during framing but at the same time constantly maintains its connection with the driving means or source of power. The connection shown herein comprises a vertical drive shaft 27 entering the housing 20 and having a splined connection with a gear 28 rotatably mounted in the housing between retaining members 29 and 30.

The housing 20 may be moved up or down for framing and be held in adjusted positions by any suitable means. One suitable form of adjusting or framing means is illustrated and comprises a worm gear 31 fast on a hand shaft 32 and engaging a gear 33 threaded on a vertical rod 34 secured to the housing 20. A hand knob 32a is secured on the end of the shaft 32 convenient to the operator. The housing is held in any adjusted position to which it may be carried by the inherent locking action of the adjusting mechanism.

Any suitable means for operating the claw and pin may be provided. That illustrated comprises a cam shaft 35 equipped with a gear 36 meshing with the gear 28 on the vertical shaft 27. The cam shaft carries discs 37 provided with cams 38 operating within slots 39 of yokes 40 slidably mounted on vertical guide rods 41. The yokes are joined together and carry the claw.

The vertical rods 41 form a part of a slide 42 mounted for reciprocation on horizontal guide rods 43. It will be obvious that rotary movement of the cams 38 by interaction with the four sides of the slots 39 will produce vertical and horizontal reciprocation of the claw along a rectangular path.

The pin 26 is mounted on horizontal guides 45 adjacent the upper end of the range of vertical movement of the claw. It may be operated in properly timed relation with reference to the operation of the claw by any suitable means. Preferably it is operated directly by the claw operating mechanism as illustrated. This drive connection comprises a lever 46 pivoted to the pin at 47 and oscillatable about a fixed pivot 48. The lower end of the lever projects downward toward the horizontally reciprocable claw slide 42 and may be actuated in a direction to withdraw the pin from the film by a cam lug 49 carried by the slide. The pin may be moved inward in a direction to engage the film by a spring 50 or by a lug 51 secured to the slide 42. As shown, both the spring and lug are employed, the spring providing resilient engagement and the lug providing positive action in case the spring has not functioned properly.

The operation of the mechanism will be obvious from the above description.

It will thus be seen that the present invention provides a simple, inexpensive and dependable framing device in connection with the claw type feeding mechanism. Also that the claw mechanism is maintained in uninterrupted operation without change of phase in all adjusted positions. Moreover, the claw and pin mechanism maintains continuous engagement with the film so that it may be framed at any time without losing control thereof.

The mechanism herein provided maintains complete control over the film at all times and permits framing to be accomplished by a simple movement of the hand and when the framing mechanism has been adjusted it will be positively maintained in its adjusted position.

While one embodiment of the invention has been illustrated and described in detail to furnish an understanding of the principles of the invention, it is to be understood that the invention may be variously embodied within the limits of the prior art and the scope of the subjoined claims.

We claim:

1. Motion picture apparatus comprising in combination, a housing, means mounted on said housing for feeding film past an aperture, said means including a claw and means for engaging the film and holding it in a fixed position relative to the range of feeding movement of said claw when the claw is disengaged from the film, a cam shaft carried by said housing for operating said feeding means, a gear on said cam shaft, a vertical drive shaft extending into said housing, a gear on said housing splined to said drive shaft and connected to the gear on said cam shaft, and means for moving said housing up and down to frame the film at said aperture.

2. Motion picture apparatus comprising in combination, film feeding means including a claw and associated film engaging mechanism, means for operating said claw and film engaging mechanism in a manner to have one member always in engagement with the film for framing it, means for moving said feeding means and said operating means as a unit along the length of the film for framing, and a film movement gate element of sufficient length to hold the film in cooperating position relative to said feeding means in any adjusted position of the latter.

3. Motion picture apparatus comprising in combination, film feeding means including a claw and associated film engaging mechanism, means for operating said claw and film engaging mechanism in a manner to have one member always in engagement with the film for framing it, means for moving said feeding means and said operating means as a unit along the length of the film for framing, a film movement gate element of sufficient length to hold the film in cooperating position relative to said feeding means in any adjusted position of the latter, and means to mount said gate element for movement relative to the feeding means for confining and releasing the film.

4. Motion picture apparatus comprising in combination, a vertically movable housing, means to guide the housing in its vertical movement, means carried by said housing for feeding film past an aperture, said means including a claw holding means to hold said film stationary relative to said housing when the claw is disengaged from the film, and a threaded rod to raise or lower the housing relative to the aperture.

5. Motion picture apparatus comprising in combination, a vertically movable housing, means to guide the housing in its vertical movement, means carried by said housing for feeding film past an aperture, said means including a claw holding means to hold said film stationary relative to said housing when the claw is disengaged from the film, and means to adjust and hold the housing in any position within the range of its movement relative to the aperture.

6. Motion picture apparatus comprising in combination, a vertically movable housing, means to guide the housing in its vertical movement, means carried by said housing for feeding film past an aperture, said means including a claw holding means to hold said film stationary relative to said housing when the claw is disengaged from the film, a threaded lug carried by the housing, a threaded rod engaging the threaded lug and means to rotate the rod so as to raise or lower the housing relative to the aperture.

7. Motion picture apparatus comprising in combination, a vertically movable housing, means to guide the housing in its vertical movement, a vertical rotatable rod passing through the housing, a gear spliced to the vertical rod, means carried by the housing for feeding film past an aperture, said means including a claw holding means to hold said film stationary relative to said housing when the claw is disengaged from the film, and means operatively connecting said gear to said claw and said holding means.

8. Motion picture apparatus comprising in combination, a vertically movable housing, means to guide the housing in its vertical movement, a vertical rotatable rod passing through the housing, a cam shaft, means operatively connecting said vertical rod and cam shaft, a cam on said cam shaft, a slidable yoke operated by said cam, a claw carried by said slidable yoke for feeding film past an aperture and holding means controlled by said yoke to hold said film stationary relative to said housing when the claw is disengaged from the said film.

HERBERT GRIFFIN.
HENRY F. HEIDEGGER.